Patented May 17, 1949

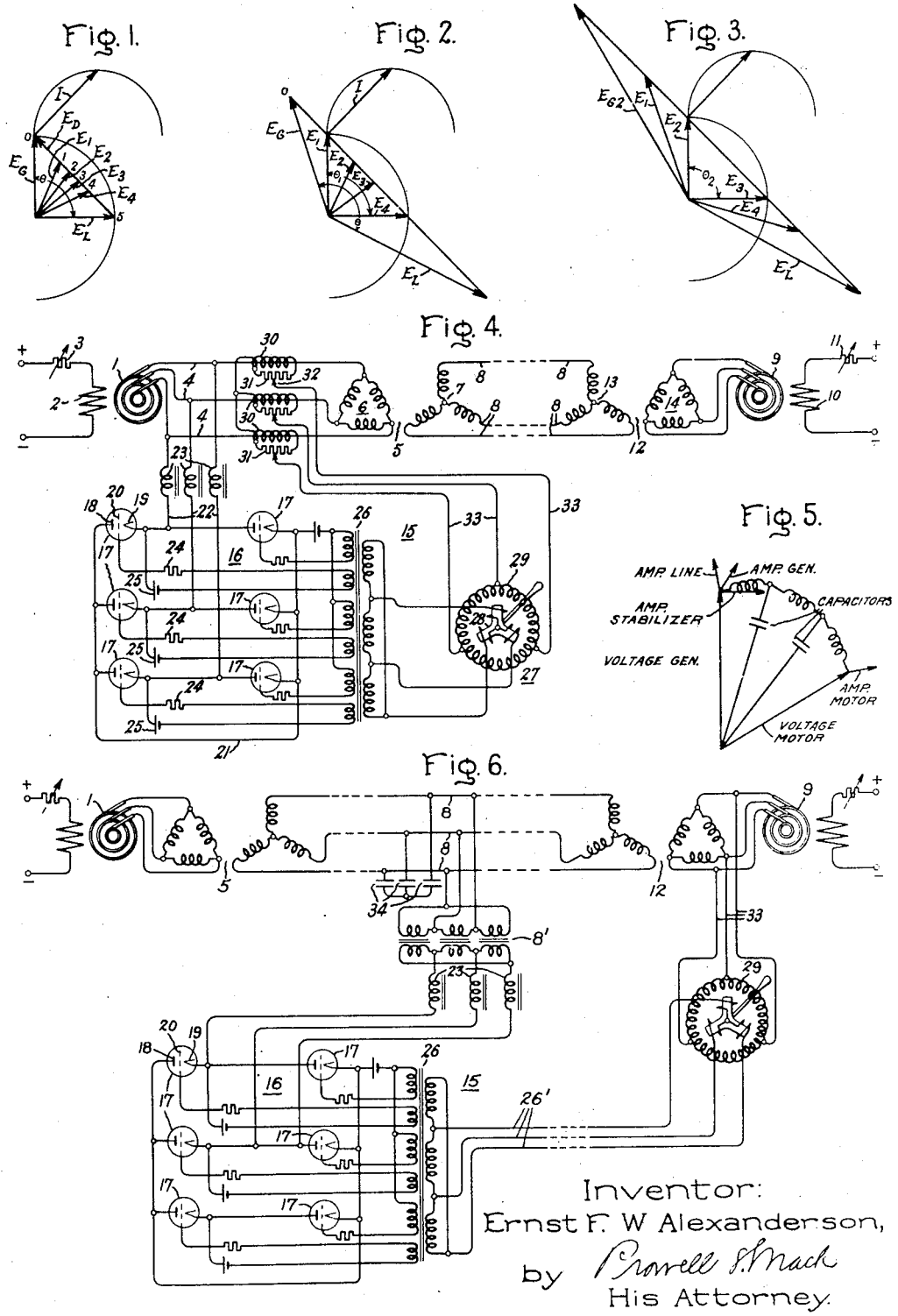

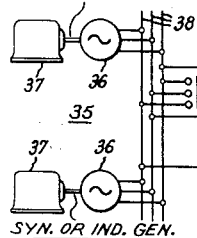

2,470,454

UNITED STATES PATENT OFFICE 2,470,454

STABILIZER FOR ALTERNATING CURRENT POWER TRANSMISSION SYSTEMS

Ernst F. W. Alexanderson, Schenectady, N. Y., assignor to General Electric Company, a corporation of New York Application May 13, 1947, Serial No. 747,787

26 Claims. (Cl. 172—237)

My invention relates to alternating current electric power transmission systems, and more particularly to a stabilizer for such systems involving the transmission of electric power over long distances between synchronous machines or between asynchronous machines and synchronous machines.

The limitations of conventional synchronous power transmission are well known. It has been proven, both in theory and practice, that the limit for stable operation of conventional synchronous systems is reached when the reactive drop in the transmitting line conductor is of the order of 35 electrical degrees. The term "long line" as used herein applies in general to a line having a physical length of the order of 300 miles or more, as well as any "electrically long line" in which the inherent inductive reactance is several times in excess of the resistance of the line. It has been pointed out in the literature that most long distance transmission lines involving synchronous terminal apparatus operate at a load corresponding to the surge impedance of the line. This is the loading where the inductance and the capacity of the line neutralize each other so that the voltage remains constant throughout the line. It is thus obvious that the limitation of alternating current power transmission is not in the capability of the transmission line to carry power long distances, but the limitation is in the terminal apparatus. This limitation specifically is instability of phase relations between synchronous machines connected to the line and consequent lack of adequate synchronizing power. In long straightaway alternating current power transmission lines of the order of a quarter wavelength, which is of the order of 750 miles for sixty-cycle power, the problem of transmitting power between synchronous machine becomes very acute since such lines are completely lacking in synchronizing power between the synchronous terminal apparatus at uniform normal voltage throughout the line or when the line is operated at or near its natural surge impedance load at normal uniform voltage.

It is an object of my invention to provide a new and improved system for the transmission of alternating current power.

It is another object of my invention to provide a new and improved system of transmitting power between synchronous machines.

It is a further object of my invention to provide a new and improved system of transmitting power between an asynchronous machine and a synchronous machine.

It is a still further object of my invention to provide a new and improved stabilizer for alternating current power transmission systems.

It is another object of my invention to provide a new and improved system for the transmission of power between synchronous apparatus without relying upon the power transmission conductors for transmitting synchronizing forces between the terminal synchronous apparatus of the system.

A still further object of my invention is to provide a new and improved stabilizer for use with an alternating current system which is capable of quickly exchanging reactive power with the system in accordance with the phase angle or rate of change of phase angle between terminal apparatus of the system.

Another object of my invention is to provide a new and improved device of the non-rotating type which will operate analogously to a synchronous condenser, but substantially without time delay, in its ability to interchange reactive power with an alternating current circuit.

In accordance with one illustrated embodiment of my invention, I provide a system of synchronous power transmission in which the transmission line is not depended upon solely for furnishing the synchronizing power. Synchronization is attained artificially through a stabilizer comprising an inductive reactive load connected at the generator terminals or at some intermediate point in the line controlled without delay or time lag in accordance with variations in phase angle between generating and receiving station machines.

In accordance with another illustrated embodiment of my invention, I provide a system of power transmission between an alternating current generating station which may comprise synchronous generators or asynchronous generators and a synchronous machine receiving station with the stabilizer including shunt capacitors connected at the generating station and serving as an exciter for the induction generators if used, and also performing the function of voltage regulation and stabilization. In addition, means are provided so that the stabilizing function is performed not only in accordance with phase angle but in accordance with rate of change of phase angle.

The novel features which I believe to be characteristic of my invention are set forth with particularity in the appended claim. The invention itself, however, both as to organization and method of operation, together with further objects and advantages thereof, will best be understood by reference to the following description taken in connection with the accompanying drawings, in which Figs. 1, 2, 3, 5, 7, 8 and 9 are explanatory diagrams to aid in the understanding of the operation of the stabilizer in the several systems illustrated; Fig. 4 is a diagrammatic representation of one embodiment of my invention in a synchronous power transmission system with the stabilizer connected at the generator end and control effected in accordance with line current; Fig. 6 is a diagrammatic representation of another embodiment of my invention in a synchronous power transmission of a greater length than that contemplated for the arrangement of Fig. 4 and wherein the stabilizer is connected at an intermediate point of the line and controlled in accordance with the voltage at the receiver station, and Fig. 10 is a diagrammatic representation of a still further embodiment of my invention illustrating another form of the reactive current electronic stabilizer controlled in accordance with both phase angle and rate of change of phase angle between terminal machines and also an asynchronous system of power transmission rendered possible by use of the stabilizer in the manner indicated.

In Figs. 1, 2 and 3 I have shown vector diagrams illustrative of the conditions in a conventional synchronous system under several assumed conditions, with the idea of bringing out more clearly the manner in which my system operates with the stabilizer. If we assume a synchronous generator and a synchronous motor separated by a transmission line, conditions for stability limit, with fixed excitation on the machines and ideal round rotors, are shown by the vector diagram of Fig. 1. In this diagram $E_G$ represents the internal voltage of the generator, $E_L$ represents the internal voltage of the motor and $E_D$ represents the vector difference between $E_G$ and $E_L$. The difference voltage may be considered as divided into portions of which 0—1 is the drop corresponding to the generator armature reaction, 1—2 the drop across the generator transient impedance, 2—3 line drop, 3—4 the drop across load transient impedance, and 4—5 the drop corresponding to load armature reaction. The voltage vectors $E_2$ and $E_3$ are the voltages actually seen by voltage measuring devices at the machine terminals and for short lines are approximately .7 of $E_G$ and $E_L$. As the motor is loaded, its pole axis lags behind the generator pole axis by the angle $\theta$, the vector difference $E_D$ of effective voltage follows a circular locus. The current vector $I$ follows a similar locus. Neglecting circuit resistance, the current $I$ has the greatest projection on the voltage $E_G$ when angle $\theta$ equals 90 degrees. For any greater angular lag, the restoring torque as measured by $E_G I \cos \theta/2$ is less and the load falls out of step.

If we now assume that the excitation of the machine is changed and is changed fast enough to hold constant the voltages $E_1$ and $E_4$ back of transient reactance during a transient, then the stability diagram takes the form of the vector diagram shown in Fig. 2. The angle $\theta$ at pullout between $E_G$ and $E_L$ is greater than 90 degrees but the angle $\theta_1$ between the maintained voltages $E_1$ and $E_4$ is 90 degrees. The voltages $E_G$ and $E_L$ now have considerably greater numerical values but these are not real voltages. They are the voltages that would exist at no load with the same excitation and no saturation. The demagnetizing effect of the load current results in only the voltages $E_1$ and $E_4$ actually being induced. Under transient conditions the inductance coupling between field and armature tends to maintain these generated voltages and so the usual field regulator must be only fast enough to support currents already set up by transient currents.

Following this reasoning one step farther, if the magnitude of $E_2$ and $E_3$ (the line terminal voltages) can be maintained, the stability diagram can be represented as in Fig. 3. The stability limit now corresponding to the angle $\theta_2$ equals 90 degrees. The generated voltages $E_1$ and $E_4$ exist but the difference between them and the terminal voltage is absorbed as a drop in the transient reactance of each machine. In the past, efforts have been made to introduce a corresponding change in the generated voltages $E_1$ and $E_4$ by an increase of field current, but such changes take place so slowly that very little improvement in stability has been realized.

In accordance with my invention, an inductive reactive load stabilizer is connected in parallel relation to the transmission line as a variable reactive power absorbing circuit so that the field strength of the generator needed to meet any transient disturbance is already established, and the higher voltage inherent in the generator is impressed on the line without delay by checking or decreasing the current flow in the stabilizer.

In Fig. 4 of the drawings, I have illustrated very diagrammatically a synchronous alternating current transmission system comprising a source of alternating current diagrammatically represented by a synchronous generator 1 provided with a field winding 2 which is energized from a suitable source of direct current excitation indicated by the + and − signs through a variable resistance 3. The variable resistance 3 is intended to represent the conventional quick response field regulator and excitation equipment of modern-day synchronous generators. The generator 1 is connected through transmission conductors 4 and a step-up transformer 5, provided with a primary winding 6 and a secondary winding 7, to the high voltage transmission line represented by conductors 8. To indicate distance, an intermediate portion of each transmission line conductor is shown dotted. By way of example, it may be assumed that the transmission line between machine terminals is of the order of six hundred miles. The receiving station is represented by a synchronous machine 9 which may be taken to represent both synchronous generators and synchronous motors of a typical receiving station. The synchronous machine 9 is provided with a field winding 10 energized from a suitable source of direct current indicated by the + and − signs through a variable resistance 11 which is intended to represent for generators the conventional quick response field regulator and excitation equipment of modern-day synchronous machines. The receiving station is connected to the transmission line 8 through a step-down transformer 12 having a primary winding 13 connected to the transmission line 8 and a secondary winding 14 connected to the generator 9. The usual circuit interrupting means for the transmission system will, of course, be provided in a commercial system, but these devices have been omitted from the drawing for purposes of simplifying the disclosure.

In accordance with this embodiment of my invention, I connect a reactive current stabilizer 15 across the generator terminals and so control the stabilizer that the reactive current taken thereby varies in magnitude in such a manner as to render available immediately the desired generator voltage back of transient reactance to maintain stability of the system. The stabilizer 15, as illustrated, comprises a short circuited rectifier 16 comprising six electronic tubes 17, each provided with an anode 18, a cathode 19 and a grid or control electrode 20 and connected for three phase full wave rectification, with tubes which are 180 degrees apart in phase position mounted back-to-back and with the cathode of one tube connected to the anode of another. The tubes 17 as well as the tubes shown in Fig. 10 are preferably of the gaseous or vapor type because of the greater current carrying capacity of this type of tube and although, for purposes of simplication, they are shown as of the thyratron type they may be of the ignitron type where current magnitudes require that type of tube. The direct current circuit of the rectifier comprises a conductor 21 which, as previously stated, constitutes a virtual short circuit of the output circuit of the rectifier. The rectifier 17 is connected to the generator output conductors 4 through conductors 22, each of which has connected in series relation therewith an inductance device 23. The inductive reactance of the inductance device 23 is appreciably higher than that usually used in a conventional rectifier circuit. Although many refinments in excitation circuits have been developed for rectifiers utilizing either thyratrons or ignitrons such as that shown in Patent No. 2,419,465, granted April 22, 1947, upon an application of B. D. Bedford, I have shown a simplified excitation circuit, for purposes of illustration. In order to render the tubes 17 alternately conductive and non-conductive in the proper sequence, the grid or control electrode 18 of each tube is connected to its associated cathode through a current limiting resistor 24 and a bias battery 25, with the proper phase winding of the secondary windings of grid transformer 26 having the primary windings thereof connected to be energized from a phase adjusting device 27. The phase adjusting device 27 may be of the rotary type having a movable polyphase secondary winding 28 and a polyphase stator winding 29. The energization of the excitation transformer 26 and consequently the energization of grids 18, in carrying out my invention, should be in accordance with a component of voltage corresponding to the phase of the voltage of the receiving station 9. This component of voltage may be obtained through an auxiliary means or circuit such as a communication channel provided by wires, radio or any angular motion transmitting means. However, when the stabilizer is connected at the generator terminals, I have found that it is satisfactory to energize the grid excitation transformer in accordance with a component of voltage derived from the current in the line conductors at the generator end. Accordingly, I have shown current transformers 30, connected one in each line conductor 4 with an impedance 31 shown as a resistor connected across each transformer to derive a component of voltage corresponding to the line current. Each of the impedances 31 may be provided with an adjustable tap 32 from which supply conductors 33 are connected to the primary winding of the phase adjuster 27.

The vector diagram of Fig. 5 shows the relationship of currents and voltages of the transmission line 8, the generator 1, the stabilizer 15 and the receiving station machine 9. It will be observed that the voltage component derived from the line current will be in quadrature therewith and substantially in phase with the motor voltage. Any departure of the desired phase relation between the grid regulating component of voltage from the motor voltage may be adjusted by the phase adjuster 27. Having adjusted this phase relation, the grids of the stabilizer will be controlled through the generator current in accordance with the phase of the motor voltage.

The operation of the system illustrated in Fig. 4 may be better understood by first considering the operation of an ordinary grid controlled tube rectifier. In such a rectifier, the direct current output voltage can be controlled by shifting the phase of the grid voltage relative to the anode voltage from a full in-phase condition for maximum voltage to a 90 degree retard condition when the direct current voltage is zero and no appreciable current flows even if the rectifier is short circuited. The stabilizer operates in substantially the same way with the difference that the usual reactance in series with the direct current terminals is eliminated, and the reactance in series with the alternating current terminals is greater than that used with a conventional rectifier so that the maximum current that can flow is limited to a moderate overload on the generator. The stabilizer 15 is arranged to draw an inductive reactive load continuously so that the field strength of the generator needed to meet a transient is at all times established. If, as the load is increased, the generator voltage swings toward a larger phase angle with respect to the motor voltage, the change in phase angle between the voltage of anodes 18 and the voltage applied to grids 20 of the tubes 17 in effect amounts to a retard of the grid voltage with respect to its anode voltage, and thereby results in reducing the inductive reactive load consumed by the stabilizer 15 so that the generator voltage increases. The change in reactive power drawn by the stabilizer is thus varied inversely with the change in phase angle between voltages of the terminal machines. This in effect causes the torque reaction on the shaft of the generator to increase so as to restore the normal phase angle between voltages of the terminal machines. An artificial synchronizing force is thus introduced which added to the natural synchronizing force makes it possible to carry a higher load.

The transmission line, as illustrated in the system of Fig. 4, has been simulated by an artificial transmission having an electrical length of six hundred miles which is equivalent to 66 electrical degrees at 55 cycles for the line per se. It has been operated reliably at a phase displacement of 60 electrical degrees between machine terminals, which is 90 per cent of surge impedance loading with a margin of safety. With this normal load, the current has a capacitive component at both ends. If there is a swing of phase angle between terminal voltages due to a shock on the system, the power flow over the line will increase with increasing phase angle and the accompanying current increase will react as a synchronizing force. In this case, however, the current is nearly constant because the line resonance gives it an effect approaching infinite impedance. The artificial synchronizing force differs in its action from the natural synchronizing force. During the process of pulling into step, the stabilizer acts as a commutator increasing the power flow when it is in the right direction and decreasing it when it is in the wrong direction. Tests have indicated that the kva. of the stabilizer need not be more than fifty per cent of the kva. of the transmission line, although a lower ratio is satisfactory if a smaller margin of safety can be permitted.

In Fig. 6 I have shown an embodiment of my invention which is adapted for a sixty cycle transmission line having a length greater than six hundred miles, and it may be taken to represent a line of the order of nine hundred miles in length. The elements in this system which correspond to those illustrated in Fig. 4 have been assigned like reference numerals. The principal difference between this system and that of the system of Fig. 4 is that the stabilizer 15 is connected at an intermediate point of the transmission line, and the excitation voltage for the grids 20 of the tubes 17 of the stabilizer is controlled directly by the receiver end voltage by connecting the phase adjuster conductor 33 to the terminals of machine 9 through a conductor 26'. An intermediate section of the voltage transmitting circuit 26' is shown dotted to indicate distance, and as will occur to those skilled in the art this transmitting circuit may be provided by wires, radio or any angular motion transmitting means. A further addition to this embodiment of my invention is the connection of a three-phase capacitor 34 at an intermediate point of the line and conveniently at the same point as the stabilizer and in parallel therewith, in the event it is desired to operate the system beyond the surge impedance loading of the line. Since the stabilizer 15 is connected to the midpoint of the high voltage transmission line it will be necessary with presently available tubes to utilize a step-down transformer 8'.

The operation of the embodiment of my invention shown in Fig. 6 may be explained as follows: In this system the voltage applied to the anodes 18 of the tubes 17 corresponds in phase and amplitude to the voltage at the intermediate point of the line, whereas the voltage on the grids 18 corresponds in phase and amplitude to the voltage of machine 9. Hence, the phase relation between the voltage of the line and the motor voltage determines the amount of reactive power drawn by the stabilizer 15. As this phase angle increases, the stabilizer draws less reactive current and vice versa in a manner to maintain the desired voltage at the intermediate point of the line. A 60 cycle line of the order of nine hundred miles is appreciably greater than a quarter-wavelength line and has a phase displacement of the order of 104 electrical degrees if operated at its surge impedance loading. The electronic stabilizer of my invention connected at the midpoint makes operation of such a line possible at a line phase displacement of the order of 90 to 100 electrical degrees which is somewhat below the surge impedance loading of the line. Under this condition of operation, an excess of capacitive kva. is drained off through the electronic stabilizer and constitutes the margin of safety. If it is desired to operate the system at a load greater than the surge impedance loading of the line, the capacitors 34 connected in parallel to the line will furnish the additional necessary capacitive kva. over the inductive kva. consumed by the line so that the stabilizer can still draw reactive kva. with an adequate margin of safety.

In order to understand the behavior of a transmission system of this type, it may be helpful to consider further explanatory diagrams Figs. 7, 8 and 9 to obtain more of a physical and visual picture of the meaning of the artificial synchronizing force as utilized in my systems. The behavior of a long transmission line can be visualized by a polar diagram of voltages as shown in Fig. 7. The vector $E_T$ represents the transmitter voltage, $E_R$ the receiver voltage, $E_1$, $E_2$ and $E_3$ line voltages at the points indicated. If the line is operated at surge impedance load and no charging current is drained off at any particular point, the polar diagram would be a sector of a circle indicating constant current at all points of the line. For the sake of stability, an inductive reactive controllable current must be drawn from the line and if at the midpoint the voltages, as illustrated in Fig. 6, will be slightly depressed at the midpoint where the stabilizer is connected and bulged between points of regulated voltage, as shown in Fig. 7. If the current drawn by the stabilizer is reduced, the result will be that the voltage will be increased at all points of the line and a new locus for the line voltage can be drawn through the ends of vectors $E'_1$, $E'_2$ and $E'_3$. Analysis of this polar diagram has shown that the area included in the sector within the more or less bulging line is proportional to the power transmitted over the system and consequently the differential area included between the inner and outer locus lines represents the increment of power which has resulted from the change in the electronic control of the stabilizer. This theory has been confirmed by plotting the polar diagrams as shown in Fig. 8 in which $E_T$ represents the transmitted voltage and $E_R$, $E_{R1}$, $E_{R2}$ and $E_{R3}$ represent different receiver voltages for various conditions of line operation with different amounts of compensation effected by the stabilizer. In some cases, the locus curve bulges out to twice normal voltage. The physical meaning obtained from a consideration of Figs. 7 and 8 is that a uniform voltage all over the line transmits the maximum power possible at that voltage because the sector is completely filled. The regulating function of the electronic stabilizer consists in increasing or decreasing the power flow over the line so as to maintain the desired phase angle between the ends of the line. This operation presumes an adequate margin of controllable increment. If this margin is adequate, it is actually used only to a small extent because the regulating function holds the voltage and the phase angles accurately as desired. This is because a high controllable increment corresponds to a high sensitivity so that a fault is corrected before it has developed. These relationships have been explored and are shown in explanatory diagram, Fig. 9, where curve $a$ represents the steady state variation of power transmitted at different phase angles between line terminals, and curve $b$ shows the controllable increment. In the apparatus studied, I found these two curves would cross at 100 degrees phase displacement where the controllable margin is zero, and also found that at 90 degrees phase displacement a substantial margin of controllable increment was available and operation was found steady and reliable although the power transmitted was close to its maximum.

In Fig. 10 I have shown a further embodiment of my invention which discloses a different form of the stabilizer shown in Figs. 4 and 6, and also shows how the stabilizer may be used in an asynchronous system as well as in a synchronous system. A transmitting station 35 is diagrammatically represented by a pair of alternating current generators 36 which may be synchronous or induction generators, each arranged to be driven by a suitable prime mover 37 and connected to energize a transmitter station bus 38. Since, as is well known, the speed of an induction generator must increase with load to maintain a constant frequency, it will be understood, in the absence of parallel operated synchronous generators, that the prime movers 37 will be equipped with suitable speed regulating means to maintain the desired frequency in the system. On the other hand, when the generators 36 are induction generators and operated in parallel with synchronous generators (not shown), it will be understood, as is well known, that the voltage and frequency of the system will be controlled by the voltage and frequency of such synchronous machines. A receiving station 39 is diagrammatically represented by a pair of synchronous motors 40 connected to a receiving station bus 41. A transmission line 42 interconnects the transmitting bus 38 and the receiving bus 41. An intermediate portion of the transmitting line is dotted to indicate distance. All conventional switchgear and transformers have been omitted from this diagram for purposes of simplifying the drawing, although such apparatus is intended to be used with the system in accordance with present-day practice in commercial power systems. However, a short circuiting switch 38' has been very diagrammatically shown as connected across bus 38 and a circuit interrupting means 41' has been shown at the receiver bus for use when the system is operated with induction generators as will be pointed out in describing the operator of such an asynchronous system.

In accordance with this embodiment of my invention, a stabilizer 43 is connected at the transmitting station end across the line 42 and comprises two series-connected electronic rectifiers 44 and 45. The electronic rectifier 44 comprises six electronic tubes 46, each provided with an anode 47, a cathode 48 and a control electrode or grid 49 and connected for three phase full wave rectification with tubes which are 180 degrees apart in phase position mounted back-to-back and with the cathode of one tube connected to the anode of another. The rectifier 44 on the alternating current side is connected to the line 42 through conductors 50' with an inductive reactor 50 connected in series with each conductor 50'. The electronic rectifier 45 similarly comprises six electronic tubes 51, each provided with an anode 52, a cathode 53 and a control electrode or grid 54 and connected for three phase full wave rectification in the same manner as rectifier 44. The rectifier 45 on the alternating current side is connected to the line 42, through conductors 55, with an inductive reactor 56 connected in series with each conductor 55. The two rectifiers 44 and 45 are connected in series relation by the conductor 57 which interconnects the common cathode connection of rectifier 44 and the common anode connection of rectifier 45, and further by a short circuit connection 58 which interconnects the direct current output terminals of the two rectifiers.

In order to obtain a response in accordance with rate of change of phase angle between terminal machines, I connect a current shunt 59 in series relation with the short circuiting conductor 58. Across the current shunt 58, I connect a bridge circuit in the form of a Wheatstone bridge comprising a series of closed resistors 60, 61, 62 and 63. Alternate junction points 64 and 65 of the bridge are connected across shunt 59, and a control circuit indicated by conductors 66 is connected across the junction points 67 and 68 which alternate with the points of connection of said shunt. Capacitors 69 and 70 are connected across opposite resistor arms 61 and 63, respectively, in order to cause the bridge circuit to respond to rate of change of current through the shunt and thereby indicate rate of change of phase angle between terminal machines.

One purpose of the series connection of the two groups of three phase full wave rectifiers 44 and 45 is to obtain the equivalent of twelve-phase operation to eliminate the fifth and seventh harmonics which arise with the six-tube circuit shown in Figs. 4 and 6. With the twelve-tube arrangement illustrated in Fig. 7, the fifth and seventh harmonics may be eliminated or substantially eliminated, and the eleventh and thirteenth harmonics may be eliminated in a similar way by a twenty-four phase connection. However, this latter connection has not been found to be necessary since the inductive reactances 50 and 56 are so much higher than in ordinary rectifier circuits. In order to obtain the equivalent of a twelve-phase connection, the control electrode circuits are so arranged that one six-phase unit is rendered conductive thirty electrical degrees ahead of the other unit. This is obtained by shifting the control electrode circuit of one unit fifteen electrical degrees ahead and the other fifteen electrical degrees in retard of the average firing phase position of the two units. For this purpose, I have diagrammatically illustrated a known form of phase transformation means comprising a transformer 71 having a primary winding 72 and secondary groups of windings 73. The primary winding 72 may comprise a conventional three-phase delta-connected winding, while the secondary windings comprise a three-phase delta-connected section 74 with winding sections 75, 76 and 77 each provided with a midpoint connection and with the midpoint of the respective sections connected successively to the vertices of the delta-connected winding 74. The winding sections 75, 76 and 77 are carried respectively on the core leg of its oppositely associated winding of the delta-connected winding 74. The terminals of each winding section are arranged to cover a span of thirty electrical degrees with respect to the neutral of its associated delta connected windings 74. Six transformers 78, 79, 80, 81, 82 and 83 are provided to energize the control electrode or grid circuits of the two groups of tubes of the rectifiers 44 and 45. The transformer 78 is provided with a primary winding 84 and a pair of secondary windings 85 and 86. Each of the other transformers 79 to 83 is similarly provided with a primary winding and a pair of secondary windings. The primary windings of transformers 78, 79 and 80 are connected successively as viewed in the drawing in a clockwise direction to points of advanced phase of winding sections 77, 75 and 76, whereas the primary winding of transformers 81, 82 and 83 are connected successively as viewed in the drawing in a clockwise direction to points of retarded phase of winding sections 77, 75 and 76. In order to render the tubes 46 alternately conductive, various forms known in the art may be selected for best operation but I have shown a simplified excitation circuit for purposes of illustration, which is well known in the art, and in which the grid or control electrode 49 of each tube is connected to its associated cathode through a current limiting resistor 87 and a bias battery 88, and the proper phase winding of the secondary windings of transformers 78, 79 and 80. The tubes 51 of rectifier 45 are provided with a similar excitation circuit in which the control electrode 54 of each tube is connected to its associated cathode through a current limiting resistor 89 and a bias battery 90 and the proper phase winding of the transformers 81, 82 and 83.

In this embodiment of my invention I have again shown control of the rectifier for phase angle response in accordance with a component of voltage variable with line current at the generator end of the system, although, depending upon the use to which the stabilizer is put, it may be desirable to connect the control of the stabilizer for voltage response, or some other variable quantity, either at its point of connection or as shown in Fig. 6 at the receiver end of a line. As illustrated, I provide current transformers 91 connected one in each line conductor 42, with an impedance 92 shown as a resistor connected across each transformer to derive a component of voltage corresponding to line current. Each of the impedances 92 may be provided with an adjustable tap 93 from which supply conductors 94 are connected to the primary winding of a rotary type of phase adjuster 95. Output conductors 96 from the phase adjuster 95 are connected to an automatically operated phase retarding means 97 to be operated in response to the rate of change of phase angle obtained from current shunt 59. The phase shift device 97 is illustrated as being of a one-step device although various other forms of the stepless type known in the art may be used without departing from my invention in its broader aspects. As illustrated, the phase shift device 97 comprises a three-phase delta-connected transformer winding 98 with extension windings 99, 199 and 101 connected, respectively, at the vertices of the delta and wherein each section is wound on the core of the winding of the delta opposite its vertex and, hence, its phase voltage corresponds to its opposite delta winding. Under steady state conditions, the three-phase conductors from the primary winding of transformer 71 are connected through resistors 102, 103 and 104 to the respective junction terminals of the delta winding 98, beginning as viewed in the drawing with the top vertex and proceeding in a clockwise direction. With this connection, the transformer 72 is energized in accordance with the phase of the voltages from transformers 91 as set by the phase adjuster 95. In order to obtain a quick retardation of the voltages applied to the control electrode excitation circuits automatically in response only to a current decrease in the short circuit connection of the stabilizer, I provide polarized relays 105, 106 and 107 which, upon closing, switch the connections of the three conductors to transformer 71 from the vertices of the delta to the terminals of the dephased section windings 99, 100 and 101, respectively, thereby retarding the voltage applied to the control electrode circuit a fixed amount so as to decrease the reactive current taken by the stabilizer.

For several reasons, which will be pointed out hereinafter, I connected capacitors 108 in three-phase connection across the conductors 42 at the point of connection of the stabilizer. Inductance devices 108' may be connected in series relation with the capacitors 108 to eliminate any objectionable harmonics which are not eliminated by the particular phase multiplication connection of the stabilizer rectifiers.

The operation of the combination of the stabilizer 43 and the capacitors 108 as a controllable reactive current device or phase modifier per se may be first considered. Since the firing control of one rectifier is shifted fifteen degrees ahead and the other fifteen degrees in retard of the average phase position of the stabilizer 43, each rectifier unit thereof will generate a direct current voltage, one in a positive direction and the other in a negative direction so that the direct current voltage of the respective units oppose each other. As a consequence, the series connected rectifiers may be connected in series. Such a connection has not heretofore been considered possible without the use of transformers on the alternating current side. All of the twelve tubes will, therefore, function together as a unit for regulating purposes, and the sequence of firing will be equivalent to that of a conventional twelve-phase unit with a wye-delta connected transformer. With the combination of stabilizer 43 and capacitors 108 connected, as shown, to a bus or distribution circuit and made responsive to the voltage of the bus or distribution circuit at the point of connection of the stabilizer, it will now be evident that it can be used as a substitute for a synchronous condenser in order to regulate voltage and control the supply of leading current to the bus, in view of the fact that the stabilizer varies the amount of lagging reactive current drawn in response to the variable condition which regulates the voltage of the control electrode circuits of the rectifier tubes. Thus, the net reactive kva furnished to the bus 42 is determined by the amount of lagging reactive kva drawn by the stabilizer. Since the stabilizer can be operated from zero lagging reactive kva, to its full rated lagging reactive kva, it will be evident that the combination can be operated as the full equivalent of a synchronous condenser but without the usual time delay and saturation difficulties of dynamoelectric machine.

The operation of the stabilizer 43 will now be considered with respect to its operation in a long distance power transmission system as shown in Fig. 10, where the transmitter station comprises alternating current machines 36 driven by suitable prime movers. In such a system if the machines 36 are induction generators the capacitors 108 may serve as an exciter for the induction generators, and the stabilizer performs the function of voltage regulation and stabilization. An asynchronous system of this type may have possible advantages in increased stability and easier recovery from faults than a synchronous system. One advantage of the use of an induction generator is that a line fault can be cleared without synchronization. This has been demonstrated by tests and recorded by oscillograms. To clear the line fault, the terminals of the induction generator are short circuited by switch 38' while the line is disconnected from the receiving system by switch 41'. A fraction of a second later the line connections are reestablished and the oscillograms show how the system builds up into normal operation without synchronization. The induction generator may be of the squirrel cage type or of the wound rotor type with secondary resistance. The electronic stabilizer when functioning in the manner heretofore described will give artificial stability to a synchronous system which would otherwise be totally unstable and inoperative. It should also be noted that in an asynchronous system although the rotor of the induction generator may operate asynchronously, it is necessary to regulate the phase angle between line terminals since a synchronizing force, in a certain sense, is required and is provided by the stabilizer.

The system shown in Fig. 10 also incorporates operation of the stabilizer for either a synchronous or an asynchronous system in response to rate of change of phase angle. Tests have been made which demonstrate the increased stability if such a response is introduced. The rectified current of the stabilizer obtained in the short circuit connection 58 varies in response to rate of change of phase angle since the bridge circuit, having the capacitors 69 and 70 connected across opposite arms of the bridge, makes the bridge responsive only to rate of change of current through shunt 59 and not to absolute current values. When the terminal voltages start to swing apart in phase, the stabilizer, in accordance with the operation heretofore described, immediately draws a smaller reactive current from the line. While this current is decreasing, the bridge becomes unbalanced and a voltage appears across the conductors 66 to operate the relays 105, 106 and 107 to close the contacts thereof and immediately to retard the grids to a maximum or preselected condition of retard. This operation permits the stabilizer promptly to prevent overswing of the terminal voltages by abruptly decreasing the lagging reactive power drawn thereby. As soon as the direct current ceases to change, the contacts of relays 105, 106 and 107 are opened and the stabilizer returns to its control in response to line current or line voltage, depending upon the variable condition selected for control. Since the relays 105, 106 and 107 are shown as polarized, this sudden retardation in phase of the tube excitation circuits is only effected when the current in the shunt 59 is decreasing.

While I have shown and described particular embodiments of my invention, it will occur to those skilled in the art that various changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States is:

1. In a system of distribution having remotely situated alternating current dynamo-electric machines with an electrically long transmission line interconnecting the same, comprising a reactive power absorbing circuit for connection in parallel relation to the transmission line and including electronic means operable to control the amount of reactive power input to said absorbing circuit, and means independent of synchronizing forces transmitted by said transmission line and connected for response in accordance with the phase displacement between the voltages of said remotely situated alternating current machines for controlling said electronic means to vary the amount of reactive power drawn by said power absorbing circuit in a manner to maintain a synchronous relation between said machines.

2. In a system of distribution having remotely situated synchronous dynamo-electric machines with an electrically long transmission line interconnecting the same, comprising a reactive power absorbing circuit for connection in parallel relation to the transmission line and including electronic means operable to control the amount of reactive power absorbed by said absorbing circuit, and means connected for response in accordance with the phase relations between voltages of the alternating current machines for controlling the conductivity of said electronic means inversely with a change in said phase relations.

3. In a system of distribution having a remotely situated induction generator and synchronous motor interconnected by an electrically long transmission line, comprising a reactive power absorbing circuit for connection in parallel relation to the transmission line and including electronic means operable to control the amount of reactive power absorbed by said absorbing circuit, capacitor means for connection in parallel relation with said absorbing circuit and having a capacitance sufficient to supply the excitation of the induction generator, and means for deriving a voltage in accordance with the phase of the terminal voltage of the synchronous motor with respect to a voltage of the generator and connected to vary the conductivity of said electronic means inversely with an increase or decrease of the phase angle between said voltages.

4. A reactive power phase modifier for connection to an electric power circuit, comprising an electronic rectifier including electronic tubes each provided with a control electrode, an alternating current input circuit for said rectifier, inductive reactance means connected in series relation with said input circuit, static capacitance means for connection to the electric power circuit in parallel relation to said input circuit, a direct current output circuit for said rectifier, means including a non-reactive closed circuit conductor connected across said output circuit and constituting a virtual short circuit thereof, means connected to the control electrodes of said rectifier tubes for controlling the conductivity thereof, and means having a variable output voltage in accordance with the variation in electric energization thereof connected to said last mentioned means and arranged for connection to the electric power circuit.

5. A reactive power phase modifier for connection to an electric power circuit, comprising an electronic rectifier including electronic tubes each provided with a control electrode, an alternating current input circuit for said rectifier, inductive reactance means connected in series relation with said input circuit, static capacitance means for connection to the electric power circuit in parallel relation to said input circuit, inductive reactance means connected in series relation with said capacitance means, a direct current output circuit for said rectifier, means including a non-inductive closed circuit conductor connected across said output circuit and constituting a virtual short circuit thereof, means connected to the control electrodes of said rectifier tubes for controlling the conductivity thereof, and means having a variable output voltage in accordance with the variation of current therethrough connected to said last mentioned means and arranged for connection to the electric power circuit.

6. Stabilizing means adapted to control the operation of an alternating current power transmission system having a plurality of alternating current machines remotely situated and interconnected by an electrically long transmission line, comprising inductive reactance means for connection in shunt relation to the transmission line, electronic means having a control circuit for controlling the flow of inductive reactive current from the transmission line to said inductive reactive means, and means operative in accordance with the phase relation between voltages of the machines at the terminals of the power system and connected to control said control circuit of said electronic means so as to change the inductive reactive current flow to the inductive reactive means inversely with a change in said phase relation.

7. Stabilizing means adapted to control the operation of an alternating current power transmission system having alternating current terminal machines interconnected by a transmission line, comprising an electronic tube rectifier having each tube thereof provided with a control electrode and also having direct current output terminals and alternating current input conductors for connection in parallel relation to the transmission line, an inductive reactance element connected in series relation with said alternating current input conductors, a conductor for interconnecting said direct current terminals and acting as a virtual short circuit of said rectifier, an energizing circuit connected to the control electrodes of said electronic tubes and arranged to control the current conducted thereby, and means for changing the energization of said energizing circuit in accordance with the phase relation between voltages of the terminal machines of the system.

8. Stabilizing means adapted to control the operation of an alternating current power transmission system having an alternating current generator and an alternating current synchronous motor remotely situated and interconnected by an electrically long transmission line, comprising a polyphase electronic tube rectifier having each tube thereof provided with a control electrode and also having direct current output terminals and alternating current input conductors for connection in parallel relation to the generator end of the transmission line, inductive reactance means connected in series relation with each of said alternating current input conductors, current transformers arranged for connection in said transmission line at the generator terminals thereof and connected to energize the control electrode of each tube of said rectifier in accordance with the current in the transmission line, and a short circuiting conductor connected across the output terminals of said rectifier.

9. A stabilizer adapted to control the operation of two interconnected alternating current devices having electric quantities respectively which are variable in phase, comprising an electronic tube rectifier for connection as a parallel branch circuit at a point in the interconnection between the devices and provided with input and output circuits, an inductive reactance means connected in series relation with said input circuit, a closed circuit conductor acting as a virtual short circuit connected across said output circuit, and means responsive to a predetermined relation between said electric quantities for controlling the current of said rectifier.

10. A stabilizer adapted to control the transmission of power between an alternating current source and a synchronous dynamo-electric machine interconnected with said source through an electrically long transmission circuit, comprising an electronic tube rectifier for connection as a parallel branch circuit at a point in the transmission circuit intermediate the source and the synchronous machine and provided with input and output circuits, a reactor connected in the input circuit of said rectifier, a closed circuit conductor acting as a virtual short circuit connected across said output circuit, and means responsive to the voltage of the synchronous machine for controlling the current of said rectifier.

11. A stabilizer adapted to control the transmission of power between an alternating current source and a synchronous dynamo-electric machine interconnected with said source through an electrically long transmission circuit, comprising an electronic tube rectifier for connection as a parallel branch circuit at a point in the transmission circuit intermediate the source and the synchronous machine and provided with input and output circuits, a reactor connected in the input circuit of said rectifier, a closed circuit conductor acting as a virtual short circuit connected across said output circuit, a capacitive reactive means connected in parallel relation with the input circuit of said rectifier, and means responsive to a voltage of the transmission line for controlling the current of said rectifier.

12. A stabilizer adapted to control the transmission of power between an alternating current source and a synchronous dynamo-electric machine interconnected with said source through an electrically long transmission circuit, comprising an electronic tube rectifier for connection as a parallel branch circuit at a point in the transmission circuit intermediate the source and the synchronous machine and provided with input and output circuits, a reactor connected in the input circuit of said rectifier, a closed circuit conductor acting as a virtual short circuit connected across said output circuit, a capacitive reactive means connected in parallel relation with the input circuit of said rectifier, an inductive means connected in series relation with said capacitive reactance and acting therewith to suppress harmonics of the fundamental voltage of the transmission circuit, and means responsive to a voltage of the transmission line for controlling the current of said rectifier.

13. A stabilizer adapted to control the transmission of power between an induction generator and a synchronous motor remotely situated and interconnected by an electrically long transmission line, comprising an electronic tube rectifier for connection as a parallel branch circuit to said transmission line at a point intermediate the generator and motor and provided with input and output circuits, the electronic tubes of said rectifier each being provided with a control electrode, a reactor connected in said input circuit, a closed circuit conductor constituting a virtual short circuit connected across said output circuit, a capacitor connected in parallel relation with said input circuit, and current responsive means for connection to said transmission line at the generator terminals and connected to energize each of said control electrodes.

14. A variable reactive current device, comprising an electronic tube conversion device having a plurality of electronic tubes each provided with an anode, a cathode and a control electrode and arranged for rectification of alternating current, an alternating current input circuit for said conversion device, a direct current output circuit for said conversion device, inductive reactance means connected in series relation with said input circuit, capacitive reactance means connected in parallel relation with said input circuit, a closed circuit conductor acting as a virtual short circuit and connected across said output circuit, and means for varying the energization of the control electrodes of said electronic tubes.

15. A variable reactive current device, comprising an electronic tube conversion device including two groups of a plurality of electronic tubes with each group of tubes being connected as a rectifier, each of said tubes being provided with an anode, a cathode and a control electrode, means for connecting said rectifiers in series relation including a closed circuit conductor acting as a virtual short circuit for the direct current of said rectifiers, an alternating current input circuit connected to each rectifier group, inductive reactance means connected in each of the input circuits, means for energizing the anode-cathode circuit of each tube with a voltage of given phase, and means for energizing the control electrodes of each tube with a voltage variable in phase relative to said given voltage.

16. A polyphase reactive current device comprising an electronic conversion device including two groups of a plurality of electronic tubes in which each group of tubes is connected for three-phase full-wave rectification, each of said tubes being provided with an anode, a cathode and a control electrode, means for connecting the two rectifier groups of tubes in series relation including a conductor acting as a virtual short circuit of the direct current of said rectifier, a three-phase alternating current input circuit connected to each rectifier group, inductive reactance means connected in each of the input circuits, means for energizing the anode-cathode circuit of each tube with a voltage of given phase, excitation means for each control electrode, a three-phase circuit for energizing said excitation means with a voltage displaced in phase relative to said given voltage, and phase converting means connected between said last mentioned three-phase circuit and said excitation means for effecting energization of said excitation means by a polyphase system of voltages greater than three phase.

17. A polyphase reactive current device comprising an electronic conversion device including two groups of a plurality of electronic tubes in which each group of tubes is connected as a rectifier for three-phase full-wave rectification, each of said tubes being provided with an anode, a cathode and a control electrode, means for connecting the two rectifier groups of tubes in series relation including a conductor acting as a virtual short circuit of the direct current of said rectifier, a three-phase alternating current input circuit connected to each rectifier group, inductive reactance means connected in each of the input circuits, means for energizing the anode-cathode circuit of each tube with a voltage of given phase, excitation means for each control electrode, a three-phase circuit for energizing said excitation means with a voltage displaced in phase relative to said given voltage, and three-phase-to-twelve-phase converting means connected between said last mentioned three-phase circuit and said excitation means for effecting twelve-phase energization of said excitation means.

18. A variable reactive current device, comprising an electronic tube conversion unit including two groups of a plurality of electronic tubes with each group of tubes being connected as a rectifier, each of said tubes being provided with an anode, a cathode and a control electrode, means for connecting said rectifiers in series relation including a closed circuit conductor acting as a virtual short circuit for the direct current of said rectifiers, an alternating current input circuit connected to each rectifier group, inductive reactance means connected in each of the input circuits, means for energizing the anode-cathode circuit of each tube with a voltage of given phase, means for energizing the control electrode of each tube with a voltage variable in phase relative to said given voltage, and means for modifying the energization of said last mentioned means in accordance with the rate of change of phase angle between said voltages.

19. A variable reactive current device, comprising an electronic tube conversion unit including two groups of a plurality of electronic tubes with each group of tubes being connected as a rectifier, each of said tubes being provided with an anode, a cathode and a control electrode, means for connecting said rectifiers in series relation including a closed circuit conductor acting as a virtual short circuit for the direct current of said rectifiers, an alternating current input circuit connected to each rectifier group, inductive reactance means connected in each of the input circuits, means for energizing the anode-cathode circuit of each tube with a voltage of given phase, means for energizing the control electrodes of each tube with a voltage variable in phase relative to said given voltage, and means for abruptly decreasing the conductivity of said tubes in accordance with the rate of change of increasing phase angle between said voltages.

20. A variable reactive current device, comprising an electronic tube conversion unit including two groups of a plurality of electronic tubes with each group of tubes being connected as a rectifier, each of said tubes being provided with an anode, a cathode and a control electrode, means for connecting said rectifiers in series relation including a closed circuit conductor acting as a virtual short circuit for the direct current of said rectifiers, an alternating current input circuit connected to each rectifier group, inductive reactance means connected in each of the input circuits, means for energizing the anode-cathode circuit of each tube with a voltage of given phase, means for energizing the control electrodes of each tube with a voltage variable in phase relative to said given voltage, and means connected in series relation with said conductor and responsive only to a decrease of current in said conductor for modifying the voltage of said excitation means for each control electrode.

21. A stabilizer adapted to control the transmission of power between an induction generator and a synchronous machine remotely situated and interconnected by an electrically long transmission line, comprising an electronic tube rectifier for connection as a parallel branch circuit to said transmission line at the generator terminals of said line and provided with input and output circuits, the electronic tubes of said rectifier each being provided with a control electrode, inductive reactance means connected in said input circuit, a closed circuit conductor constituting a virtual short circuit connected across said output circuit, a capacitor connected in parallel relation with said input circuit and having a capacitance sufficient to supply the excitation of said induction generator, current transforming means for connection in series relation with said transmission line, impedance means connected across said current transforming means for deriving a component of voltage variable in phase and amplitude in accordance with the voltage of said synchronous machine, an excitation circuit for energizing the control electrodes of said tubes, and means for energizing said excitation circuit in accordance with the component of voltage derived from said impedance means.

22. A variable reactive current device, comprising an electronic tube conversion device having a plurality of electronic tubes each provided with an anode, a cathode and a control electrode and arranged for rectification of alternating current, an alternating current input circuit for said conversion device, a direct current output circuit for said conversion device, inductive reactance means connected in series relation with said input circuit, a closed circuit conductor acting as a virtual short circuit and connected across said output circuit, and means for energizing the control electrodes of said tubes with a voltage variable in phase with respect to the anode voltage thereof.

23. A variable reactive current device, comprising an electronic tube conversion device having a plurality of electronic tubes each provided with an anode, a cathode and a control electrode and arranged for rectification of alternating current, an alternating current input circuit for said conversion device, a direct current output circuit for said conversion device, inductive reactance means connected in series relation with said input circuit, a closed circuit conductor acting as a virtual short circuit and connected across said output circuit, means for energizing the anode-cathode circuit of each tube with a voltage of given phase, means for energizing the control electrode of each tube with a voltage variable in phase relative to said given voltage, and means for modifying the energization of said last mentioned means in accordance with the rate of change of phase angle between said voltages.

24. A variable reactive current device, comprising an electronic tube conversion device having a plurality of electronic tubes each provided with an anode, a cathode and a control electrode and arranged for rectification of alternating current, an alternating current input circuit for said conversion device, a direct current output circuit for said conversion device, inductive reactance means connected in series relation with said input circuit, a closed circuit conductor acting as a virtual short circuit and connected across said output circuit, means for energizing the control electrodes of said tubes with a voltage variable in phase with respect to the anode voltage thereof, and means responsive only to a decrease in current in said closed circuit conductor for modifying the energization of said control electrodes.

25. A stabilizer adapted to control the transmission of power between an alternating current generator and a synchronous machine remotely situated and interconnected by an electrically long transmission line, comprising an electronic tube conversion unit including two groups of a plurality of electronic tubes in which each group of tubes is connected as a rectifier for three-phase full-wave rectification, each of said tubes being provided with an anode, a cathode and a control electrode, means for connecting the two rectifier groups in series relation including a closed circuit conductor acting as a virtual short circuit for the direct current of said rectifiers, a three-phase alternating current input circuit connected to each rectifier group, inductive reactance means connected in each of the input circuits, means for energizing the anode-cathode circuit of each tube with a voltage at the generator terminals, excitation means for each control electrode, a three-phase circuit for energizing said excitation means with a voltage variable in phase and amplitude in accordance with the current at the generator terminals, a phase multiplying converting means connnected between said last mentioned three-phase circuit and said excitation means for effecting multi-phase energization of the control electrodes of said tubes, means connected in said closed circuit conductor for producing a component of voltage only upon a change in current therein, means for abruptly retarding the phase of the voltage of the three-phase circuit of said excitation means, and means responsive only to the component voltage arising from a decrease in current in said closed circuit conductor for operating said last mentioned means.

26. In a system of distribution having a remotely situated induction generator and synchronous motor interconnected by a transmission line, comprising a reactive power absorbing circuit for connection in parallel relation to the transmission line and including electronic means operable to control the amount of reactive power absorbed by said absorbing circuit, capacitor means for connection in parallel relation with said absorbing circuit and having a capacitance sufficient to supply the excitation of the induction generator, means for deriving a voltage in accordance with the phase of the terminal voltage of the synchronous motor with respect to a voltage of the generator and connected to vary the conductivity of said electronic means, means for short circuiting the terminals of the induction generator, and switching means for opening the transmission line at the motor terminals.

ERNST F. W. ALEXANDERSON.

REFERENCES CITED

The following references are of record in the file of this patent:

UNITED STATES PATENTS

| Number | Name | Date |
| --- | --- | --- |
| 2,059,001 | Lampson | Oct. 27, 1936 |

FOREIGN PATENTS

| Number | Country | Date |
| --- | --- | --- |
| 397,229 | Great Britain | Aug. 24, 1933 |

Certificate of Correction

May 17, 1949

Patent No. 2,470,454

ERNST F. W. ALEXANDERSON

It is hereby certified that errors appear in the printed specification of the above numbered patent requiring correction as follows:

Column 1, lines 39 and 40, for the word "machine" read *machines*; column 2, line 53, for "claim" read *claims*; column 11, line 41, for the numeral "199" read *100*; column 12, line 44, after "of" insert *a*;

and that the said Letters Patent should be read with these corrections therein that the same may conform to the record of the case in the Patent Office.

Signed and sealed this 20th day of December, A. D. 1949.

[SEAL]

THOMAS F. MURPHY,
*Assistant Commissioner of Patents.*